United States Patent [19]
Cho

US005492596A
[11] Patent Number: 5,492,596
[45] Date of Patent: Feb. 20, 1996

[54] METHOD OF MAKING A MICROMECHANICAL SILICON-ON-GLASS TUNING FORK GYROSCOPE

[75] Inventor: Steve T. Cho, Newport Beach, Calif.

[73] Assignee: The Charles Stark Draper Laboratory, Inc., Cambridge, Mass.

[21] Appl. No.: 191,979

[22] Filed: Feb. 4, 1994

[51] Int. Cl.6 ...................................................... G01P 9/04
[52] U.S. Cl. ..................... 156/632.1; 156/629.1; 156/633.1; 156/634.1; 156/656.1; 156/657.1
[58] Field of Search ............................. 156/629.1, 630.1, 156/632.1, 633.1, 634.1, 643.1, 657.1, 646.1, 656.1, 662.1; 437/228; 148/DIG. 12; 73/505, 862.59, 517 R

[56] References Cited

U.S. PATENT DOCUMENTS

| 4,654,663 | 3/1987 | Alsenz et al. | 340/870.3 |
|---|---|---|---|
| 4,764,244 | 8/1988 | Chitty et al. | 156/630 |
| 4,815,472 | 3/1989 | Wise et al. | 128/675 |
| 4,881,410 | 11/1989 | Wise et al. | 73/724 |
| 5,013,396 | 5/1991 | Wise et al. | 156/628 |
| 5,055,838 | 10/1991 | Wise et al. | 340/870.37 |
| 5,169,472 | 12/1992 | Goebel | 156/281 |
| 5,216,490 | 6/1993 | Greiff et al. | 73/517 R |
| 5,313,835 | 5/1994 | Dunn | 73/505 |
| 5,329,815 | 7/1994 | Dunn et al. | 73/505 |
| 5,353,638 | 10/1994 | Marek | 156/633 X |

Primary Examiner—Thi Dang
Attorney, Agent, or Firm—Weingarten, Schurgin, Gagnebin & Hayes

[57] ABSTRACT

A micromechanical tuning fork gyroscope fabricated by a dissolved silicon wafer process whereby electrostatic bonding forms a hermetic seal between an etched glass substrate, metal electrodes deposited thereon, and a silicon comb-drive tuning fork gyroscope. The dissolved silicon wafer process involves single sided processing of a silicon substrate, including the steps of etching recesses, diffusing an etch resistant dopant into the silicon substrate, and releasing various components of the silicon gyroscope by etching through the diffusion layer in desired locations. The glass substrate also undergoes single sided processing, including the steps of etching recesses, depositing a multi-metal system in the recesses, and selectively etching portions of the multi-metal system. One substrate is inverted over the other and aligned before anodic bonding of the two substrates is performed.

25 Claims, 4 Drawing Sheets

METHOD OF MAKING A MICROMECHANICAL SILICON-ON-GLASS TUNING FORK GYROSCOPE

FIELD OF THE INVENTION

This invention relates in general to a method of making a micromechanical device, and in particular to a method of making a micromechanical silicon-on-glass tuning fork gyroscope.

BACKGROUND OF THE INVENTION

There are many methods of performing the functions of a gyroscope: rotating disc, rotating sphere, quartz tuning fork, fiber optic laser, hemispherical resonance, etc. In addition there are a number of known micromechanical gyroscope implementations, such as gimballed gyroscopes, and polysilicon and metal tuning fork gyroscopes.

The "bulk" or non-micromechanical gyroscopes are much larger, heavier, and expensive. Previous micromechanical gyroscopes have low sensitivity, are difficult to fabricate due to multiple masking and processing steps, and have problems with movable masses coming into contact with electrode material and sticking.

Sticking occurs when a resonating mass comes into contact with an underlying metal electrode, typically gold, and fails to spring free, ultimately ending in device failure. The magnitude of drive forces and pressures that can be applied to a gyroscope prone to sticking is necessarily limited by this phenomenon.

SUMMARY OF THE INVENTION

According to the teaching of the present invention there is provided a method for fabricating a micromechanical tuning fork gyroscope which includes single sided processing of a silicon substrates and a glass substrate, anodic bonding of the resultant substrate structures, and a final etch step to free the tuning fork elements. The method requires fewer and simpler processing steps, thus resulting in a lower cost and easier to fabricate micromechanical gyroscope.

In particular, the method is defined herein with respect to a comb drive micromechanical tuning fork gyroscope. Such a gyroscope has a first surface of a glass substrate over which is suspended a silicon rotatable assembly comprising first and second vibrating assemblies extending from one or more anchors. Disposed at either end of the respective vibrating assemblies are drive and driven finger electrodes formed by plural respective interleaved fingers for imparting vibrational motion to the tuning fork vibrating elements. The finger electrodes greatly increase the area and capacitance as well as the capacitance change with motion of the device so as to substantially enhance system sensitivity.

The method of fabricating such a gyroscope takes place on a first surface each of a silicon substrate and a glass substrate. With regard to the silicon substrate, one or more recesses are formed using potassium hydroxide (KOH). A single subsequent boron diffusion defines the thickness of the silicon gyroscope structure. Finally, the features of the structure are defined by using a reactive ion etch (RIE) beyond the boron etch stop layer in selected locations.

The glass substrate processing involves a first step of selectively recessing the first surface of the glass. Next, a multi-metal system such as titanium-platinum-gold is deposited on the recessed first surface, then selectively lifted off, leaving a planar glass surface with metal deposits only slightly extending beyond the surface.

Finally, one substrate is inverted over the first surface of the other, the two are aligned, and are then anodically bonded. Lead transfer to the silicon is achieved through contiguous gold deposits; due to the high temperature at which the binding process occurs, the silicon and gold sinter, thus forming a chemical bond.

While the low profile, recessed metal deposits as described may provide sufficient reduction in the potential for portions of the silicon gyroscope structure to impact a portion of the multi-metal systems, such impact would likely occur in gyroscopes subject to extreme angular rates and/or physical shocks. Sticking between the silicon and the uppermost gold layer would then result, partially due to gold being a soft material. By removing the gold in an alternate embodiment, the exposed surface of the multi-metal system is the hard platinum layer.

The step of removing the gold from metal deposits subject to silicon impact increases the resistance to sticking. However, a further step can be taken to significantly decrease the likelihood of this device failure mode. Specifically, the platinum layer can be patterned to form an array of stand-offs or posts which reduce the contact area where the masses impact. Since the sticking tendency is a function of surface area in contact, sticking is necessarily reduced by the formation of these platinum stand-offs.

The tuning fork gyroscope embodiment thus formed provides reduced discrete processing steps with a resultant reduction in production cost and fabrication time, and enhanced resistance to adhesion between the silicon structure, the glass substrate and the metallic electrodes disposed therebetween. Another beneficial result of the use of the method disclosed herein includes reduced parasitic capacitance from the use of a glass substrate.

BRIEF DESCRIPTION OF THE DRAWINGS

These and other features of the present invention are more fully set forth below in the fully exemplary detailed description and accompanying drawing of which.

DETAILED DESCRIPTION OF THE INVENTION

The present invention contemplates a micromechanical tuning fork gyroscope 10 fabricated by a dissolved silicon wafer process whereby electrostatic bonding forms a hermetic seal between an etched glass substrate 12, metal electrodes deposited thereon, and a silicon comb drive tuning fork gyroscope 14. The dissolved silicon wafer process involves single sided processing of a silicon substrate, including the steps of etching recesses, diffusing an etch resistant dopant into the silicon substrate, and releasing various components of the silicon gyroscope by etching through the diffusion layer in desired locations. The glass substrate also undergoes single sided processing, including the steps of etching recesses, depositing a multi-metal system in the recesses, and selectively etching portions of the multi-metal system. One substrate is inverted over the other and aligned before anodic bonding of the two substrates is performed.

Figure 1:
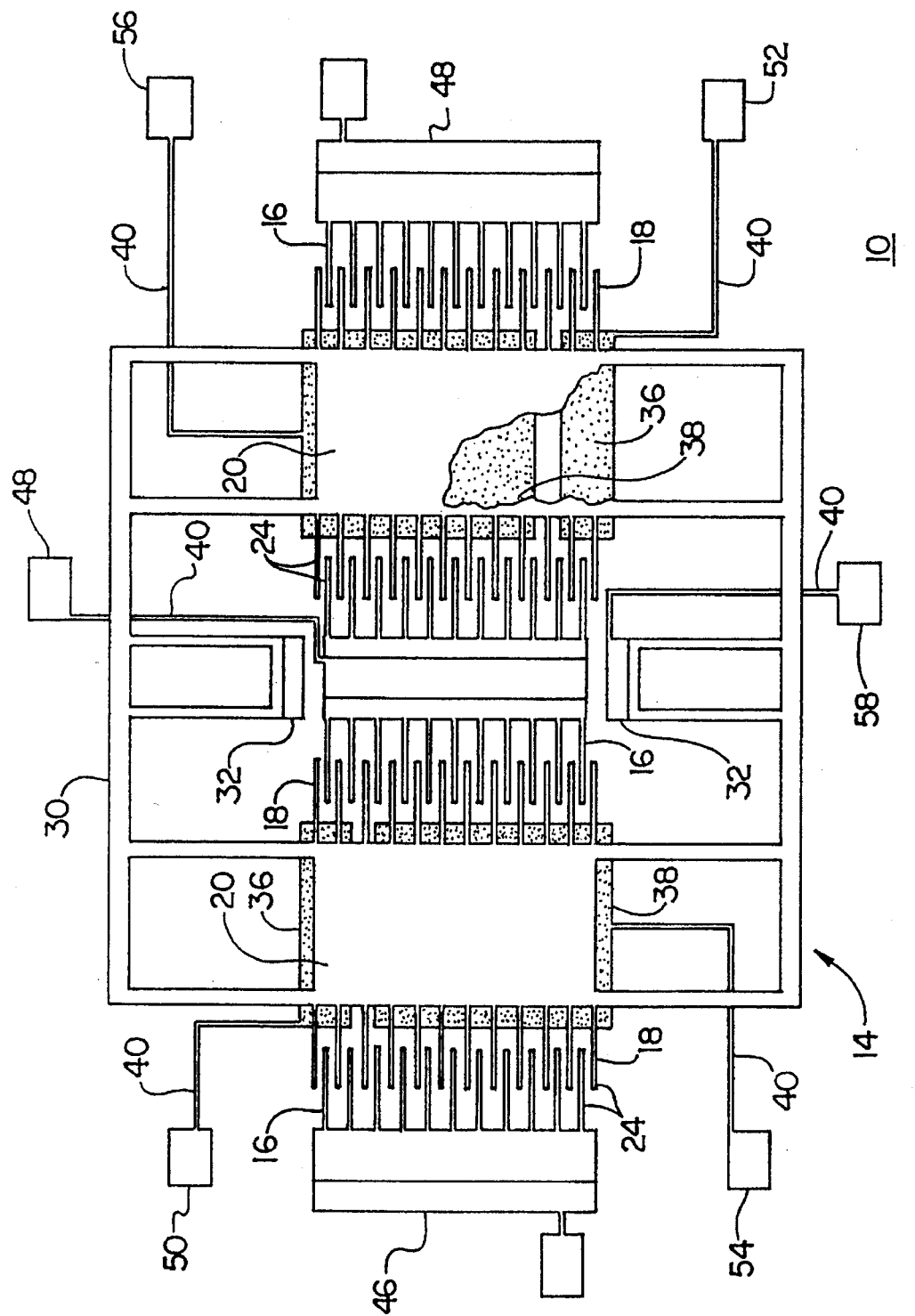
FIG. 1 is a plan diagrammatic view of one embodiment of a micromechanical comb drive tuning fork gyroscope manufactured according to the method of the present invention.

In FIG. 1, one embodiment of a comb drive gyroscope 14 fabricated according to the present invention is illustrated. The gyroscope thus formed employs drive 16 and driven finger electrodes 18 formed by plural respective interleaved fingers 24 for imparting vibrational motion to the tuning fork vibrating elements 20. The finger electrodes greatly increase the area and capacitance as well as the capacitance change with motion of the device so as to substantially enhance system sensitivity. Moreover, such an electrode structure is compatible with the dissolved silicon wafer process disclosed herein. The tuning fork gyroscope 14 thus provides reduced parasitic capacitance resulting from the use of a glass substrate, reduced discrete processing steps with a resultant reduction in production cost and fabrication time, and enhanced resistance to adhesion between the silicon structure, the glass substrate and the metallic electrodes disposed therebetween.

It is understood that the process as described herein is applicable to the fabrication of various embodiments of micromechanical comb-drive gyroscopes other than that shown in FIG. 1. However, common features of these gyroscopes include the following elements. A first surface of a glass substrate has suspended thereover a silicon rotatable assembly 30 comprising first and second vibrating assemblies 20 which extend from one or more anchors 32. The vibrating assemblies 20 are comprised of opposing comb structures made up of driven electrode fingers 24 extending therefrom. Disposed on the first surface of the glass substrate are cooperating drive electrode fingers 16 for alternating alignment with the driven finger electrodes 18. Torque 36, or rebalance, and sense electrodes 38 are disposed on the glass substrate beneath a portion of the vibrating assemblies and/or support structures extending between the vibrating assemblies and the anchors. Also disposed on the glass substrate are metallic conductive leads 40 interconnecting transducers with the electrodes 36, 38 and left 44, right 46, and center drive motors 48. These transducers include left 50 and right torque transducers 52, left 54 and right sense transducers 56, and motor transducer 58.

Figure 2A:
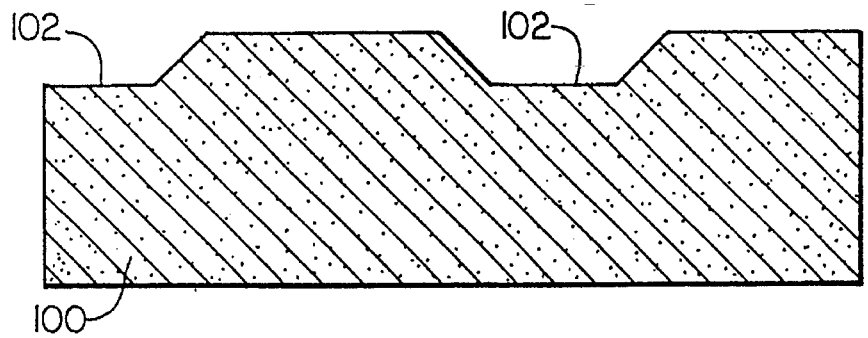
FIG. 2A is a partial section view of a silicon substrate illustrating a step of the method of the present invention.

In short, the method of fabricating a gyroscope 14 as depicted in FIG. 1 begins with reactive ion etching (RIE) and boron diffusion of silicon to define the suspended gyroscope structure. Specifically, with reference to FIG. 2A, processing starts with a p-type silicon wafer 100 of moderate doping (eg. >1Ω-cm). Recesses 102 etched into the silicon using potassium hydroxide (KOH) will eventually define the gap spacing of conducting elements which comprise the electrodes. Recesses may also be formed using RIE or plasma techniques.

Figure 2B:
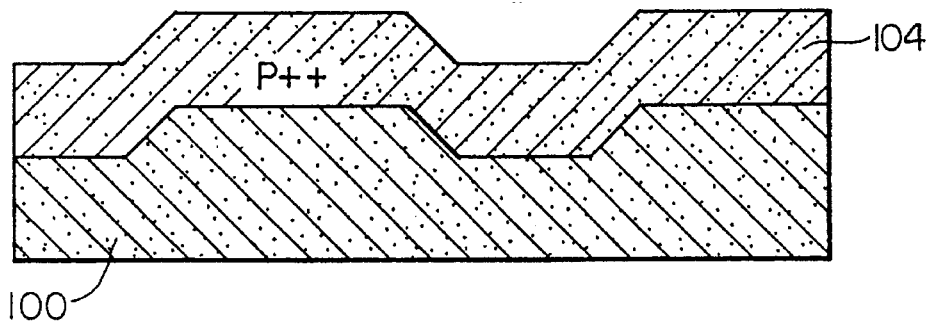
FIG. 2B is a view of the substrate of FIG. 2A illustrating a further step in the method of the present invention.

As depicted in FIG. 2B, a high temperature (eg. 1150°–1175° C.) boron (p++) diffusion 104 across the surface of the Si substrate follows. The diffusion depth, which may be in the range of 5 to 10 μm, defines the thickness of the resulting gyroscope structure.

Figure 2C:
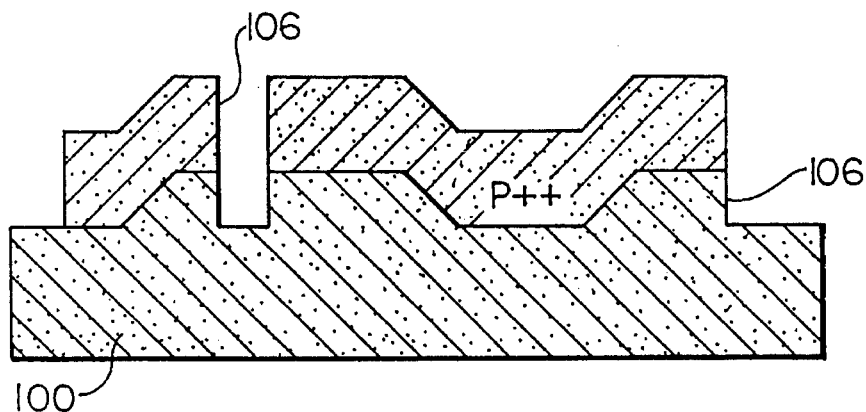
FIG. 2C is a view of the substrate of FIG. 2B illustrating a further step in the method of the present invention.

The outline of the features of the structure is defined by using RIE to etch past the p++ diffused etch stop layer 104, thus releasing and uniquely defining individual elements of the structure as shown in FIG. 2C. Preferably, a $CF_3Br$ (trifluorobromomethane) chemistry is used for etching in a parallel plate reactor, thus resulting in straight sidewalls 106 and high aspect ratios. Other chemistries, such as $BCl_3/Cl_2$ (boron tri-chloride/chlorine) or HBr (hydrogen bromide), $CF_4$ (carbon tetra flouride), $O_2$ (oxygen) chemical mixtures$_x$ can also be used.

Therefore, it is the boron diffusion 104 of FIG. 2B which defines the gyroscope thickness, and the RIE etching of FIG. 2C which defines the width of the gyroscope elements.

Figure 3A:
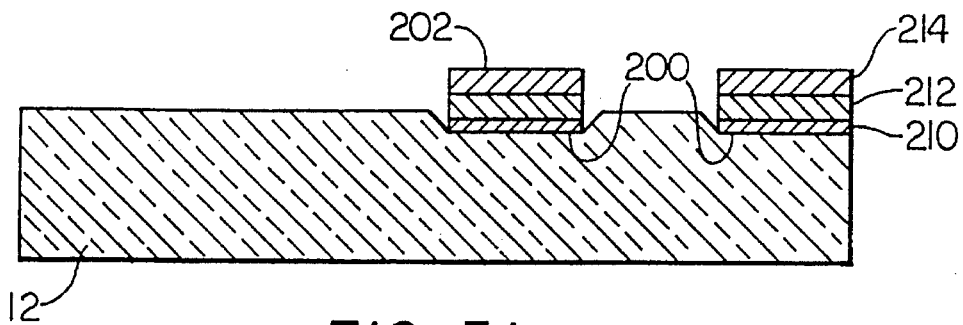
FIG. 3A is a partial section view of a glass substrate illustrating a step of the method of the present invention.
Figure 3B:
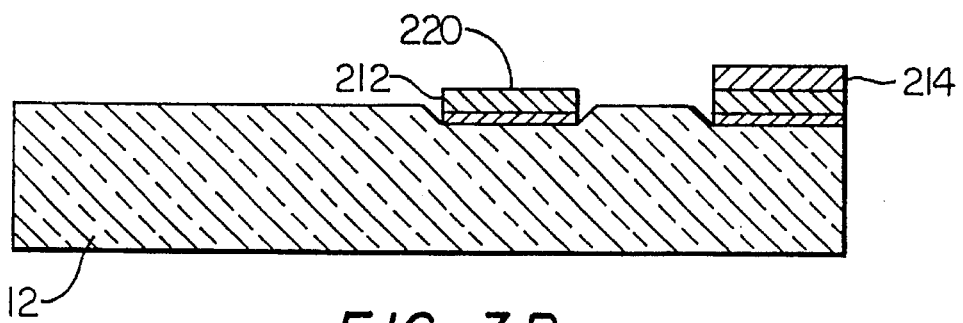
FIG. 3B is a view of the substrate of FIG. 3A illustrating a further step in the method of the present invention.
Figure 3C:
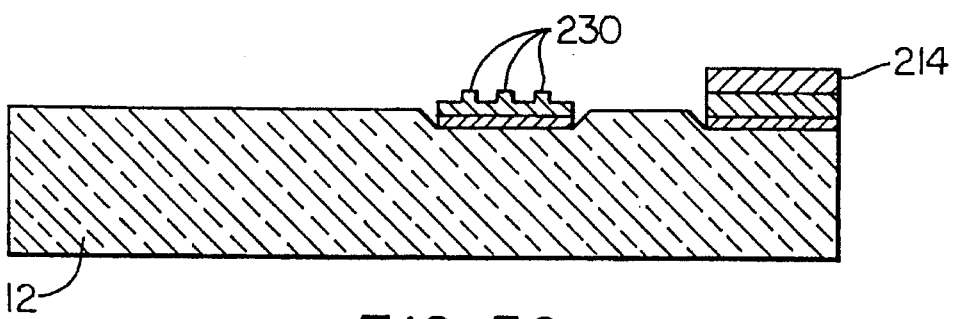
FIG. 3C is a view of the substrate of FIG. 3B illustrating a further step in the method of the present invention.

Glass processing is described with reference to FIGS. 3A–3C. In FIG. 3A, a glass wafer 12, such as #7740 Corning glass wafer, is selectively etched to form low profile metal deposition sites 200. Hydroflomric acid or plasma (e.g. RIE) may be used as the glass etchant. Next, a multi-metal system 202 is deposited in the etched recesses. One embodiment of the present invention employs a titanium-platinum-gold (Ti-Pt-Au) combination for electrode and conductor structures. Titanium 210 is deposited in the glass wafer 12 recess 200 first, for example to a thickness of 400 Å, due to its excellent adhesion to glass. Next, platinum 212 is deposited, for example to a depth of 700 Å, on the titanium 210. Finally, a layer of gold 214, 1000 Å thick for example, is deposited on the platinum 212. The gold 214 makes a superior contact point for wire bonding. Employing these exemplary thicknesses produces a planar structure with metal protruding only 500 Å above the surface of the glass 12.

The three metals do not alloy with each other, thus enabling electrostatic bonding taking place at approximately 375° C. The platinum 212 further acts as an adhesion promoter between the gold 214 and titanium 210. However, gold 214 is a soft metal which is subject to compression under moderate pressures (eg. >50 Torr).

As stated, various embodiments of micromechanical, silicon on glass, comb-drive gyroscopes are known. The minimum electrode gap between silicon devices and metal electrodes in these embodiments is ideally reduced to enable the use of higher magnitude drive forces and larger amplitude vibrations, which in turn increases gyroscope sensitivity. Electrode gap is further minimized to enable operation of gyroscopes under higher pressures. As a result of the gap minimization, "sticking" may occur; such adhesion of the silicon resonant mass to an underlying gold or other soft metal electrode can render the rate sensing device useless.

To overcome this negative aspect of micromechanical tuning fork gyroscopes, one gyroscope embodiment according to the present invention has gold replaced with a metal which is chemically stable (so that chemical reactions do not aid adhesion), which is resistant to compression, and which is resistant to EDP. Platinum 212 fulfills all these requirements, and thus is ideally suited for being an upper surface 220 of electrodes which are subject to high force silicon impact, as illustrated in FIG. 3B. It is recognized that other metals can be substituted for platinum due to their similar properties. For example, suitable metals are in the refractory, silicide, and nobel metal categories, such as tungsten, molybdenum, titanium-tungsten (TiW), paladium, iridium, tungsten silicide, and titanium silicide. However, in certain embodiments of the gyroscope, gold and gold combinations (e.g. titanium gold, platinum gold) are acceptable.

Another aspect in addressing the problem of adhesion of sticking is the vertical stiffness per contact area between the two contacting materials. If the contact area is reduced, then the effective sticking force can also be reduced. This is accomplished in the present invention by etching away the gold 214 from areas likely to come into contact with the suspended silicon device, such as at electrodes. The underlying platinum is masked and etched to form posts or stand-offs, thus reducing the total contact area, as illustrated in FIG. 3C. A suitable etchant for removal of the gold layer is iobine-based solutions.

While it is beneficial to minimize the number of stand-offs 230, too few allow the impacting silicon to drape over the stand-offs and contact the remaining platinum or exposed titanium sheet, thus increasing adhesive tendency. Four stand-offs in a square configuration act as corners for a free standing membrane; in effect, the area between the four corner stand-offs acts as a pressure sensor. The stiffness of these regions is based on plate bending theory. The linear spacing between stand-offs, $d_{max}$, is given by:

$$d_{max} = \left( \frac{Et^3h^2}{24\alpha\gamma_1\cos\theta(1-v^2)} \right)^{0.25}$$

E=Young's Modulus
t=plate thickness
h=gap spacing
θ=contact angle
v=Poisson's ratio
α=0.00581
$\gamma_1$=surface tension (72 mJ/m$^2$)

According to an exemplary embodiment, for a 0.3 μm high stand-off, $d_{max}$ is 118 μm.

One embodiment of the present invention as described and illustrated has platinum stand-offs 230. However, it should be understood that a planar layer of platinum will suffice for adhesion resistance in some gyroscope applications in light of the beneficial physical characteristics of platinum already discussed and the low profile of the metal conductors with respect to the silicon gyroscope structure suspended thereover.

In addition, the present invention has been described as employing a solid glass wafer substrate 12. The impact of any thermal mismatch between the silicon structure and glass substrate may be minimized by a relatively thick silicon structure. However, the benefits of a glass substrate, i.e. reduction in stray capacitance and ability of amorphous glass to bond over uneven silicon wafer surfaces and stray particulate, may be achieved by employing glass sputtered on a silicon wafer. Such a substrate would reduce a likelihood of thermal mismatch while still providing the aforementioned benefits resulting from anodic bonding of glass to silicon. Further, with a thinner layer of glass to be bound, low temperature anodic bonding is employed.

Figure 4A:
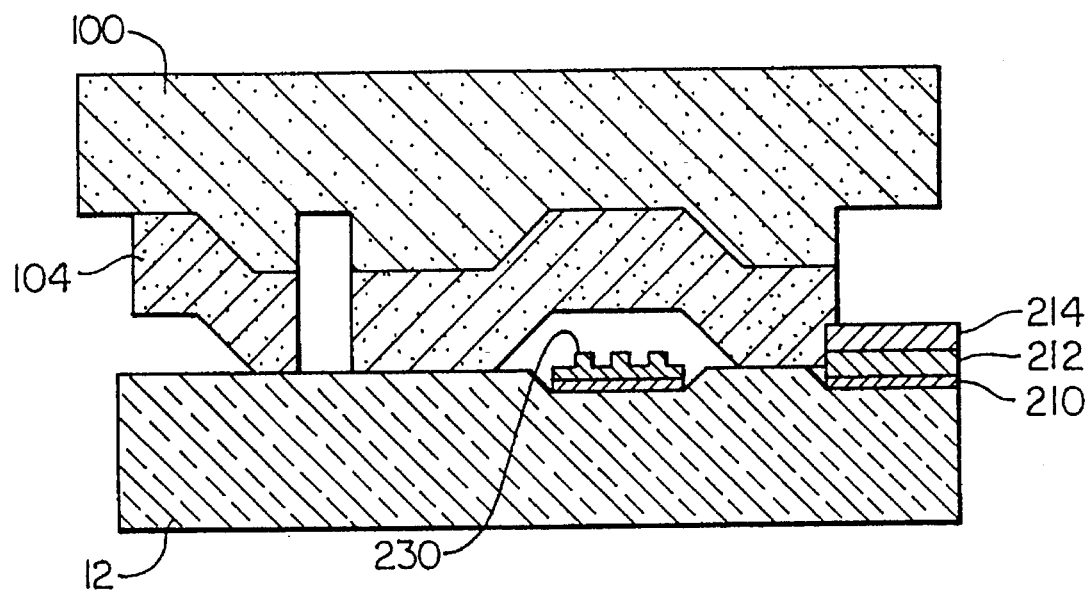
FIG. 4A is a partial section view of the substrate of FIG. 3C disposed over the substrate of FIG. 2C according to the method of the present invention.
Figure 4B:
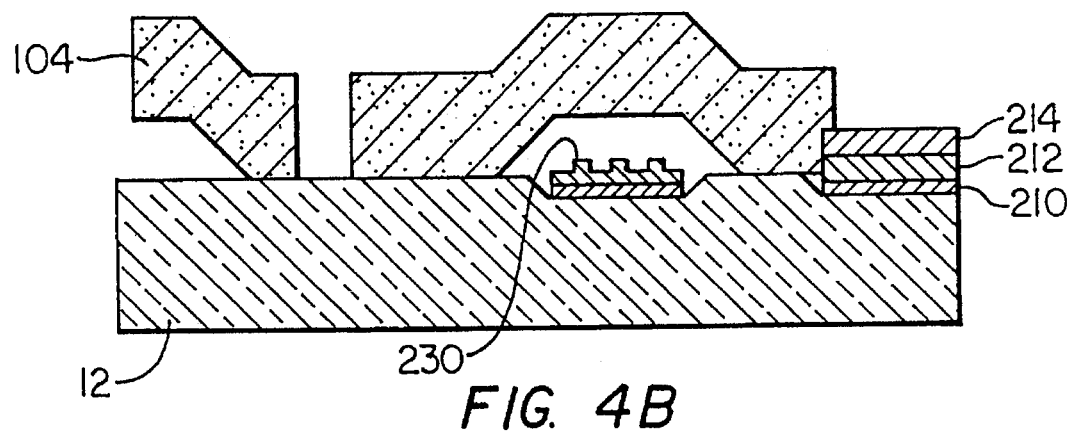
FIG. 4B is a view of the substrates of FIG. 4A illustrating a further step in the method of the present invention.

After processing of the individual silicon 100 and glass wafers 12, one wafer is inverted over the other and aligned as shown in FIGS. 4A–4B. The glass and silicon structures are electrostatically bonded at, for example, 375° C. with a potential of approximately 1000 V applied between the glass and silicon. A compression bond is formed between the gold 214, deposited on the glass substrate 12, and the silicon 100, which then sinter forming chemically bonded, electrically conductive, low-resistance leads (eg. 40Ω for a 40 μm×20 μm area).

The final step in the process is a selective etch in ethylene-diamine-pyrocatechol-water (EDP). EDP dissolves the silicon substrate 100 but stops at the heavily doped (p++) diffused layers 104. Other selective silicon etchants such as potausium hydroxide, hybrazine, and hydroflouric acid-nitric acid-acetic acid solutions are alternatives for silicon dissolving. Thus the overall fabrication sequence involves only single-sided processing with a minimum number of masking steps on silicon, one diffusion step into silicon, and one masking step on glass. The present process is both high yield and compatible with batch processing.

Although the invention has been shown and described with respect to an illustrative embodiment thereof, it should be understood by those skilled in the art that the foregoing and various other changes, omissions and additions in the form and detail thereof may be made therein without departing from the spirit and scope of the invention.

I claim:

1. A method for fabricating a comb drive tuning fork gyroscope, including associated 'electrodes, transducers, and interconnecting electrical leads, said gyroscope adapted for inertial rate sensitivity, comprising the steps of:

providing a silicon substrate having a first surface;

forming discrete elements of said gyroscope in selected regions of said first surface of said silicon substrate;

providing a glass substrate having a first surface;

forming a plurality of multilayer metal deposits in a plurality of recessed regions of said first surface of said glass substrate;

removing selected portions of said multilayer metal deposit from selected ones of said plurality of recessed regions;

bonding said first surface of said silicon substrate to said first surface of said glass substrate; and exposing said silicon substrate to an etchant.

2. The method of claim 1 wherein said step of forming gyroscope elements includes the steps of:

forming a plurality of raised regions in said first surface of said silicon substrate;

forming a doped region and an undoped region in said silicon substrate by diffusing into said silicon substrate first surface a dopant resistant to a silicon etchant; and removing selected portions of said first surface of said silicon substrate to define said discrete elements of said gyroscope.

3. The method of claim 1 wherein said step of forming multilayer metal deposits includes the steps of:

etching said first surface of said glass substrate to form a plurality of recessed regions; and forming in each of said recessed regions of said glass substrate said plurality of multilayer metal deposits by successive depositions of individual conductive metal layers.

4. The method of claim 1 wherein said step of removing a first metallic layer includes the steps of:

etching through said first metallic layer to expose a planar surface of said second layer.

5. The method of claim 1 wherein said step of removing selected portions of said multilayer metal deposit includes the steps of:

etching said first metallic layer to form a plurality of stand-offs.

6. The method of claim 5 wherein said step of etching through said first metallic layer includes the steps of:

masking said first metallic layer; and exposing said masked first metallic layer to an etchant.

7. The method of claim 6 wherein said step of etching said first metallic layer forms a regularly spaced array of said stand-offs in said first layer.

8. The method of claim 5 wherein said step of etching through said first metallic layer includes the steps of:

etching through said first metallic layer to expose said second metallic layer;

masking said second metallic layer; and etching said second metallic layer.

9. The method of claim 8 wherein said step of etching said second metallic layer forms a regularly spaced array of said stand-offs in said second layer.

10. The method of claim 8 wherein said step of etching said second metallic layer includes the step of exposing a third metallic layer from which said plurality of stand-offs extend.

11. The method of claim 8 wherein said step of etching said second metallic layer includes the step of forming a planar surface of said second metallic layer from which said plurality of stand-offs extend.

12. The method of claim 1 wherein said step of bonding said first surface of said silicon substrate to said first surface of said glass substrate includes the steps of:

inverting one of said silicon substrate and said glass substrate;

disposing said substrates in an aligned orientation; and bonding said substrates together.

13. The method of claim 12 wherein said step of bonding includes the step of anodically bonding the substrates.

14. A process for forming a micromechanical tuning fork structure adapted for use in rate sensor applications comprising the steps of:

providing a silicon substrate having a planar first surface;

forming a height varying pattern in said first surface of said silicon substrate;

exposing said first surface of said silicon substrate to a silicon dopant for a discrete time period;

removing selected portions of said silicon substrate;

providing a second substrate having a planar first surface, said first surface of said second substrate comprised of glass;

forming a plurality of recesses in said first surface of said second substrate;

depositing a plurality of superimposed metallic layers in said plurality of recesses;

removing a first metallic layer to expose a second metallic layer from at least one of said plurality of recesses;

disposing said first surface of said silicon substrate against said first surface of said second substrate; and removing a second surface of said silicon substrate not exposed to said silicon dopant.

15. The method of claim 14 wherein said step of forming a height varying pattern in said first surface of said silicon substrate includes the step of etching said first surface of said silicon substrate using potassium hydroxide or plasma techniques.

16. The method of claim 14 wherein said step of exposing said first surface of said silicon substrate includes the step of diffusing boron into said first surface of said silicon substrate.

17. The method of claim 14 wherein said step of removing selected portions of said silicon substrate includes using trifluorobromomethane chemistry in a parallel plate reactor.

18. The method of claim 14 wherein said step of providing a second substrate includes the step of providing a second substrate comprised of glass.

19. The method of claim 14 wherein said step of providing a second substrate includes the step of providing a second substrate on which a deposition of glass has been sputtered.

20. The method of claim 14 wherein said step of forming a plurality of recesses in said first surface of said second substrate includes the step of etching said second substrate using hydroflouric acid or plasma techniques.

21. The method of claim 14 wherein said step of depositing a plurality of superimposed metallic layers in said plurality of recesses includes the step of sequentially depositing a third substrate of titanium, a second substrate of platinum, and a first substrate of gold.

22. The method of claim 14 wherein said step of removing a first metallic layer to expose a second metallic layer includes the steps of:

etching said first metallic layer;

masking said second metallic layer; and etching said second metallic layer.

23. The method of claim 22 wherein said step of etching said second metallic layer forms a plurality of stand-offs extending from said second metallic layer.

24. The method of claim 14 wherein said step of disposing said first surface of said silicon substrate against said first surface of said second substrate includes the step of anodically bonding said first and second surfaces together.

25. The method of claim 14 wherein said step of removing a second surface of said silicon substrate includes the step of exposing said second surface to ethylene-diamine-pyrocatechol-water.

* * * * *